3,075,822
PROCESS FOR DYEING WOOL AND CELLULOSIC FIBERS SIMULTANEOUSLY AND PREPARATIONS SUITABLE THEREOF
Heinz Abel, Reinach, Basel Land, Switzerland, assignor to Ciba Limited, Basel, Switzerland
No Drawing. Filed Oct. 19, 1959, Ser. No. 847,050
Claims priority, application Switzerland Nov. 14, 1958
6 Claims. (Cl. 8—23)

This invention relates to a process for dyeing wool with wool dyestuffs and cellulosic fibers with direct dyestuffs simultaneously in which dyeing is carried out in a bath containing a wool immunizing agent, having an affinity for the wool, and hexamethylene-tetramine and which has an acid reaction at least at the beginning of the dyeing process.

According to the present process the wool is dyed with a wool dyestuff. The latter can belong to various classes of dyestuffs, particularly the class of acid azo dyestuffs or acid anthraquinone dyestuffs. Among the azo dyestuffs, monoazo dyestuffs come more especially into consideration. Particularly advantageous for the present process are chromium or cobalt complexes of monoazo dyestuffs which contain per atom of metal bound in complex union more than one molecule of dyestuff, at least one dyestuff molecule being free from sulfonic acid groups and from carboxylic acid groups not taking part in the formation of the complex. The heavy metal atom can, however, be bound to two different or to two similar dyestuff molecules. The complex-forming group of the dyestuffs can be, for example, an ortho-hydroxy-ortho'-aminoazo grouping, an othor-hydroxy-ortho'-carboxyazo grouping or preferably an ortho:ortho'-dihydroxyazo grouping. A large number of dyestuffs of this type which come into consideration for the present process has become known in recent years.

The cellulosic fibers which are dyed together with the wool can consist, for example of natural cellulose, such as linen or cotton, or of regenerated cellulose, such as artificial silk or spun rayon. As direct cotton dyestuffs it is of advantage to use those which have per se poor affinity for the wool fiber. These dyestuffs may also belong to different classes. For example, azo dyestuffs, especially disazo and polyazo dyestuffs which can also contain metal bound in complex union, preferably copper, azoxy dyestuffs or sulfonated copper phthalocyanines may be used.

With the above wool and direct dyestuffs the wool and the cellulosic fibers, for example so-called half-wool, are dyed simultaneously in the same bath in the presence of a wool immunizing agent having an affinity for wool. As such compounds there are to be understood those which have no dyestuff character and which, at least when they are used alone and not as in the present process in the presence of hexamethylene-tetramine, are capable of being absorbed on the wool to a greater or smaller extent, and which under the conditions mentioned above are capable of preventing absorption of substantive cotton dyestuffs on the wool, or of greatly reducing such absorption. These wool immunizing agents may be of quite different chemical composition. They contain, advantageously, an acid salt-forming group, for example an HO—, HS— or $HO_3S$ group. Compounds of the following type are examples:

(a) Condensation products of alkylnaphthalene sulfonic acids with benzoin,
(b) Thiophenols or phenols which are rendered water-soluble by reaction with a sulfide, sulfite or sulfite formaldehyde (e.g. the corresponding alkali or ammonium compounds) or by sulfonation,
(c) Condensation products from benzyl halides and naphthalene sulfonic acids,
(d) Tanning,
(e) Reaction products from formaldehyde and naphthalene sulfonic acids,
(f) Complex compounds of metals of the hydrogen sulfide group, such as antimony or preferably tin, and sulfurized phenols. The latter can be prepared by reacting a phenol with an alkali metal, hydroxide, carbonate or sulfide or with an alkaline earth metal hydroxide or sulfide in the presence of sulfur.
(g) Sulfonated condensation products from hydroxyaryl compounds of the benzene series and formaldehyde, particularly those which are obtained by condensing hydroxyaryl compounds of the benzene series, such as phenol or cresol, with formaldehyde, sulfonating the product and then again condensing the sulfonation product with formaldehyde.

A large number of such agents is known; see for example Diserens, "Die neuesten Fortschritte in der Anwendung der Farbstoffe," vol. 2 (1949), pp. 468 to 475 and 500 to 503; British patent specification 365,534. Especially good results can be obtained with the products mentioned under (f) and more particularly under (e).

The dyebath must have an acid reaction at least at the beginning of the dyeing process. The requisite acid reaction is obtained advantageously by the addition of acetic acid to the dyebath. Since hexamethylene-tetramine gives off ammonia continuously during the dyeing process, the pH value of the dyebath is increased and, in time, that of the wool too. With a quantity of acetic acid usual when dyeing from an acid bath it is, however, easily possible to carry out the dyeing process in such a way that even with a relatively long dyeing time the pH value never rises substantially above 7, so that any damage to the wool fiber by too great an alkalinity can be avoided with certainty.

The quantity of the wool immunizing agent having an affinity for wool to be added to the dyebath can vary within fairly wide limits. It can amount, for example, to about 0.3 to 3%, calculated on the weight of the fiber material to be dyed. The quantity of the hexamethylene-tetramine should be adjusted to the quantity of the immunizing agent and quantity of acid; here, too, the range is fairly wide within which the process can not only be carried out but also yields favorable results. As a general rule, for 1 part of immunizing agent at least ½ part and at most 5 parts of hexamethylene-tetramine should be used.

According to the present process the absorption of the substantive cotton dyestuff on wool is prevented by the wool immunizing agents mentioned. This effect is known in a neutral to slightly alkaline dyeing bath. It was, however, by no means to be expected that it would be enhanced in an initially acid dyebath and in the presence of hexamethylene-tetramine without adversely affecting the dyeing of the cellulosic fiber with the substantive cotton dyestuff. In most cases when dyeing half-wool a tint, as far as possible the same for both fibers, is aimed at. This is considerably facilitated by using the process of the invention, both fibers being dyed simultaneously, but only the dyestuff intended for the fiber concerned being absorbed, so that neither the wool dyestuff is fixed on the cellulosic fiber nor the direct cotton dyestuff on the wool. It was just because by hitherto known methods the direct dyestuff was always partially absorbed on the wool too that simultaneous dyeing of the two fibers in a boiling acetic acid dyebath was not usual. For these reasons it was generally preferred to dye both fibers simultaneously in a neutral to weakly alkaline dyebath. This method has the disadvantage, however, that in such dyebaths it is often very difficult to match a sample since the absorption of the cotton dyestuff on the wool is very difficult to check. Differences in the pH value, in the electrolyte concentration, in temperature and dyeing time influence the result to a very great extent. In addition, there are certain types of goods, for example mohair plush, which do not tolerate neutral dyeing. In general, handle and condition of the wool can be but hardly maintained when dyeing is carried out by the traditional neutral method. Moreover in such baths a decomposition of the dyestuffs by reducing influences often occurs. In order to avoid this, it was necessary to dye the half wool in a so-called two-bath method, viz. to predye the wool in a manner known per se in an acid bath with acid dyestuffs and then to cover the cellulosic fibers in a fresh bath containing the cotton dyestuffs, Glauber's salt and one of the above mentioned wool resisting agents, usually at about 60° C. This low temperature should prevent the wool being dyed by the cotton dyestuff even under these neutral conditions. In contrast, the present process has the advantage of simplicity, since both types of fiber are dyed simultaneously in a single operation, and, if necessary, additional suitable dyestuffs for the wool or the cellulosic fiber or both can be added in the course of the dyeing operation in order to obtain exactly the desired shade. Furthermore, the one-bath preparation of very clear two-tone effects can be achieved in this manner by using, for example, a red wool dyestuff for the wool and a blue cotton dyestuff for the cellulosic fiber.

In order to improve wet fastness properties an after-treatment can, if desired, be carried out with a wet-fastness improving agent, e.g. a condensation product from dicyandiamide and formaldehyde by a method known per se.

Instead of adding the wool resisting agent and the hexamethylene-tetramine separately to the dyebath, these substances can be mixed with one another to form stable preparations suitable for carrying out the present process. Advantageous quantities for such mixtures can be taken from the data given above.

The following examples illustrate the invention, the parts and percentages being by weight unless otherwise stated.

*Example I*

A preparation is made by mixing 1 part of a condensation product from naphthalene sulfonic acid and formaldehyde with 2 parts of hexamethylene-tetramine.

100 parts of half-wool (warp of viscose spun rayon, woof of bouclé yarn of pure wool) are entered at 50° C. in a bath containing in 4000 parts of water 40 parts of crystalline sodium sulfate, 6 parts of acetic acid of 40% strength and 3 parts of the preparation described in the previous paragraph. The bath is maintained for 15 minutes at the above temperature, and a solution of the following two dyestuffs in a little water is then added.

(a) 1:2-chromium complex of the dyestuff of the formula:

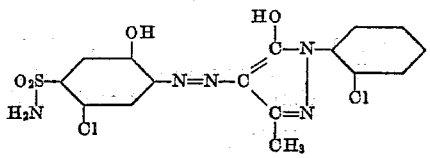

(b) Dyestuff of the formula:

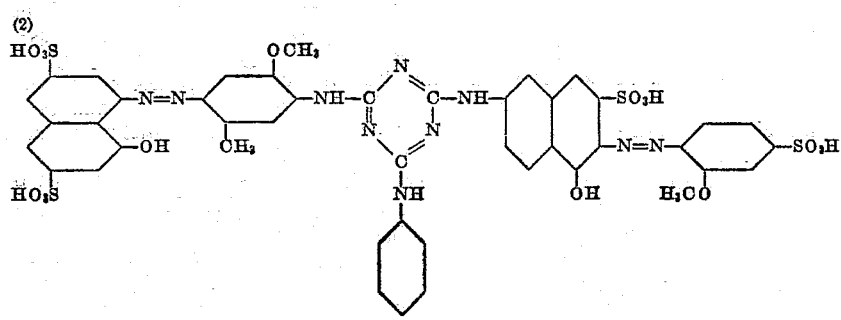

The bath is then heated to the boil in the course of 30 minutes, and dyeing is continued at the boil for one hour. A level red dyeing is obtained. Shading off additions of the one or other dyestuff may be made at any time in the customary manner without the dyeing losing its level character. Dyestuff (a) is fixed practically exclusively on the wool and dyestuff (b) is fixed practically exclusively on the cellulosic fiber.

Instead of the dyestuff combination (a) and (b), the wool dyestuffs of column I of the table below can be used with the appropriate direct dyestuffs of column II for dyeing half-wool in the manner indicated, either the same tints (Nos. 1 to 6) being obtained on both fiber materials or very clean two-color effects (Nos. 7 to 10).

Furthermore, instead of the preparation described in the first paragraph of this example other preparations can also be used which contain for 2 parts of hexamethylene-tetramine 1 part of sulfurized phenol or 1 part of tannin. Finally, instead of the finished preparation, the wool immunizing agent and the hexamethylene-tetramine can be added separately to the bath.

| No. | I Wool dyestuff | II Direct dyestuff | Tint |
|---|---|---|---|
| 1 | (3) structure with NH₂, SO₃H, anthraquinone, NH—CO—CH₂Cl | (4) structure HO₃S—〇—Cu—O—〇—N=N—〇—O—Cu—O—〇—NH—〇—O—CH₂—COOH, SO₃H | Blue. |
| 2 | (5) structure O₂S—O—〇—CH₃ with naphthol azo, HO₃S, HO, HO₃S | Dyestuff of formula (2) | Red. |
| 3 | (6) structure with triazine, Cl, N=N, SO₃H, OH, H₃C | (7) structure [COO—Cu—O—〇—N=N—〇—N—C—N—C—CH=CH—〇—NH—CO]₂, SO₃H, HO₃S, H₃C | Yellow. |
| 4 | 1:2-chromium complex of the dyestuff of the formula (8): COOH, OH, N=N, triazine with Cl, H₃C | Mixture consisting of about 88% of the dyestuff of (7) and 17% of the condensation product from 2 mols of dehydrothiotoluidine monosulfonic acid and 1 mol of 4:4'-dinitrostilbene-2:2'-di-sulfonic acid, condensed in sodium hydroxide solution under pressure, after-oxidized with hypochlorite. | Yellow. |
| 5 | 1:2-chromium complex of the dyestuff of the formula (9): OH, HO, N=N, H₃C—SO₂ | Mixture consisting of about 75% of the dyestuff of the formula (10): HO, N=N, HO₃S, N=N, SO₃H, NH₂ and 25% of the dyestuff of the formula [HO₃S—〇—O—Cu—O—〇—N=N—〇—NH—triazine—CH₃, Cl (11)]₂ | Violet-brown. |

| No. | I Wool dyestuff | II Direct dyestuff | Tint |
|---|---|---|---|
| 6 | 1:2-cobalt complex of the dyestuff of the formula (12) | Mixture consisting of about 55% of the dyestuff of the formula (13) and 45% of the dyestuff of formula (10). | Blue-green. |
| 7 | 1:2-cobalt complex of the dyestuff of the formula (15) | | Wool: grey. Cellulosic fiber: red. |
| 8 | 1:2-cobalt complex of the dyestuff of the formula (17) | | Wool: red-brown. Cellulosic fiber: green. |
| 9 | 1:2-cobalt complex of the dyestuff of the formula (18) | Dyestuff of the formula (13) | Wool: yellow. Cellulosic fiber: grey. |
| 10 | 1:2-cobalt complex of the dyestuff of the formula (19) | Condensation product from 2 mols of the dyestuff of the formula and 1 mol of 4:4'-dinitrostilbene-2:2'-disulfonic acid, condensed in sodium hydroxide solution under pressure, after-oxidized with hypochlorite. | Wool: olive green. Cellulosic fiber: orange. |

Example 2

Half-wool is dyed by the method described in Example 1 with the dyestuffs mentioned therein, but instead of the preparation described there, one is used which contains for 2 parts of hexamethylene-tetramine 1 part of the product described under (1) below; or of one obtained as shown under (2) to (7) below:

(1) Tannin.

(2) The condensation product from trichlorobenzyl chloride and 2-hydroxynapthalene is sulfonated and neutralized with sodium hydroxide solution.

(3) A mixture of phenol and para-cresol is reacted with formaldehyde, the product sulfonated and then reacted again with formaldehyde, then neutralized with ammonia.

(4) A mixture of 2 mols of phenol and 1 mol of para-octyl-phenol is condensed with 1.75 mols of formaldehyde, the reaction product is sulfonated, the sulfonic acid reacted with formaldehyde again and finally neutralized with ammonia.

(5) A mixture of 2 mols of salicylic acid and 1 mol of octyl-phenol is reacted in the manner shown under (4).

(6) A mixture of 2 mols of phenol and 1 mol of dodecyl-phenol is reacted in the manner described under (4).

(7) The complex tin compound of sulfurized phenol obtained as described in Example 2 of British patent specification 365,534.

What is claimed is:

1. Process for simultaneously dyeing wool with a wool dyestuff and cellulose fibers with a direct dyestuff from the same dyebath, which comprises carrying out the dyeing operation in a bath which contains a wool immunizing agent having an affinity for the wool and hexamethylene-tetramine and which has an acid reaction at least at the beginning of the dyeing operation; the quantity, calculated on the weight of the fiber material, of the wool immunizing agent being at least 0.3% and at most 3%, and the quantity of hexamethylene tetramine being at least 0.15% and at most 15%.

2. Process for simultaneously dyeing wool with a wool dyestuff and cellulose fibers with a direct dyestuff from the same dyebath, which comprises carrying out the dyeing operation in a bath which contains a reaction product from formaldehyde and naphthalene sulfonic acid and also contains hexamethylene-tetramine and which has an acid reaction at least at the beginning of the dyeing operation; the quantity, calculated on the weight of the fiber material, of the said reaction product being at least 0.3% and at most 3%, and the quantity of hexamethylene tetramine being at least 0.15% and at most 15%.

3. Process for simultaneously dyeing wool with a complex compound containing per atom of a metal selected from the group consisting of chromium and cobalt two molecules of monoazo dyestuff and cellulose fibers with a direct dyestuff from the same dyebath, which process comprises carrying out the dyeing operation in a bath which contains a reaction product from formaldehyde and naphthalene sulfonic acid and also contains hexamethylene-tetramine and has an acid reaction at least at the beginning of the dyeing operation; the quantity, calculated on the weight of the fiber material, of the said reaction product being at least 0.3% and at most 3%, and the quantity of hexamethylene tetramine being at least 0.15% and at most 15%.

4. Process for simultaneously dyeing wool with a complex compound containing per atom of a metal selected from the group consisting of chromium and cobalt two molecules of monoazo dyestuff and cellulose fibers with a direct dyestuff from the same dyebath, which process comprises carrying out the dyeing operation in a bath which contains a reaction product from formaldehyde and naphthalene sulfonic acid and also contains hexamethylene-tetramine and has been rendered acid with acetic acid at the beginning of the dyeing operation; the quantity, calculated on the weight of the fiber material, of the said reaction product being at least 0.3% and at most 3%, and the quantity of hexamethylene tetramine being at least 0.15% and at most 15%.

5. A stable preparation suitable as an assistant for simultaneously dyeing wool with a wool dyestuff and cellulose fibers with a direct dyestuff from the same dyebath, which preparation contains a wool immunizing agent having an affinity for the wool and hexamethylene tetramine; the ratio by weight between the wool immunizing agent and the hexamethylene tetramine being at least 1:5 and at most 2:1.

6. A stable preparation suitable as an assistant for simultaneously dyeing (a) wool with a complex compound containing two molecules of monoazo dyestuff per atom of metal selected from the group consisting of chromium and cobalt and (b) cellulose fibers with a direct dyestuff from the same dyebath, which preparation contains a reaction product from formaldehyde and naphthalene sulfonic acid and also contains hexamethylenetetramine; the ratio by weight between said reaction product and the hexamethylene tetramine being at least 1:5 and at most 2:1.

References Cited in the file of this patent

UNITED STATES PATENTS

| | | |
|---|---|---|
| 623,697 | Becke et al. | Apr. 25, 1899 |
| 990,023 | Walther | Apr. 18, 1911 |
| 1,270,348 | Walther | June 25, 1918 |
| 2,422,586 | Royer et al. | June 17, 1947 |
| 2,903,324 | Hirsbrunner | Sept. 8, 1959 |

OTHER REFERENCES

Diserens: "Chemical Technology of Dyeing and Printing," vol. 2, 1951, Reinhold Publishing Corp., N.Y., pp. 329–333.

UNITED STATES PATENT OFFICE
CERTIFICATE OF CORRECTION

Patent No. 3,075,822 January 29, 1963

Heinz Abel

It is hereby certified that error appears in the above numbered patent requiring correction and that the said Letters Patent should read as corrected below.

Column 1, line 35, for "othor-" read -- ortho- --; columns 5 and 6, second column thereof, and opposite No. 3, for that portion of the formula reading

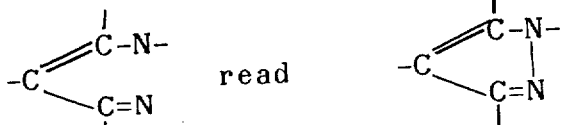

Signed and sealed this 19th day of November 1963.

(SEAL)
Attest:

ERNEST W. SWIDER

Attesting Officer

EDWIN L. REYNOLDS

Acting Commissioner of Patents